(12) United States Patent
Marocchi et al.

(10) Patent No.: US 8,971,258 B2
(45) Date of Patent: Mar. 3, 2015

(54) POLICY DETERMINATION FOR USER EQUIPMENT PROVIDNG MUTUAL AID IN A VISITED ENTERPRISE OPERATING AREA OF A LONG TERM EVOLUTION SYSTEM

(75) Inventors: James A. Marocchi, Winfield, IL (US); Anatoly Agulnik, Deerfield, IL (US); Robert A. Fredericks, Carol Stream, IL (US); Trent J. Miller, West Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 335 days.

(21) Appl. No.: 12/848,122

(22) Filed: Jul. 31, 2010

(65) Prior Publication Data

US 2012/0028626 A1   Feb. 2, 2012

(51) Int. Cl.
*H04Q 7/00* (2006.01)
*H04L 29/06* (2006.01)
*H04W 12/08* (2009.01)

(52) U.S. Cl.
CPC ............ *H04L 63/104* (2013.01); *H04L 63/107* (2013.01); *H04L 63/30* (2013.01); *H04W 12/08* (2013.01)
USPC .......................................... 370/329; 455/433

(58) Field of Classification Search
CPC .... H04L 63/104; H04L 65/4084; H04N 7/24; H04N 21/26616
USPC ................................... 370/235, 329; 455/433
See application file for complete search history.

(56) References Cited

U.S. PATENT DOCUMENTS

| | | | |
|---|---|---|---|
| 5,778,320 | A | 7/1998 | Drozt |
| 7,068,607 | B2 | 6/2006 | Partain |
| 7,092,356 | B2 | 8/2006 | Rabie |
| 7,346,340 | B2 | 3/2008 | Purnadi et al. |
| 7,565,160 | B2 | 7/2009 | Chambers et al. |
| 7,573,380 | B2 | 8/2009 | Pinder |
| 7,574,195 | B2 | 8/2009 | Krasner et al. |
| 8,233,449 | B2 | 7/2012 | Agulnik et al. |

(Continued)

FOREIGN PATENT DOCUMENTS

| | | |
|---|---|---|
| EP | 1443790 A1 | 8/2004 |
| EP | 1729532 A1 | 12/2006 |

(Continued)

OTHER PUBLICATIONS

Texas Radio Communications Interoperability Plan, 2005.*

(Continued)

*Primary Examiner* — Wanda Z Russell
(74) *Attorney, Agent, or Firm* — Valerie M. Davis; Daniel R. Bestor; Steven A. May

(57) ABSTRACT

A Mutual Aid QoS Function (MAQF) performs a method for determining policy for user equipment (UE) providing mutual aid in a mutual aid enterprise operating area of a Long Term Evolution (LTE) system. The method includes: receiving an indication that a UE is assigned to provide mutual aid in a mutual aid enterprise operating area, wherein the UE has a home enterprise operating area that is different than the mutual aid enterprise operating area; detecting that the UE has entered the mutual aid enterprise operating area; selecting a set of mutual aid policy rules for the UE while the UE is providing mutual aid in the mutual aid enterprise operating area.

15 Claims, 6 Drawing Sheets

(56) References Cited

U.S. PATENT DOCUMENTS

| | | | |
|---|---|---|---|
| 8,248,943 | B2 | 8/2012 | Ahuja et al. |
| 2003/0043741 | A1 | 3/2003 | Mukai et al. |
| 2004/0072578 | A1* | 4/2004 | Keutmann et al. ......... 455/456.1 |
| 2005/0124319 | A1 | 6/2005 | Williams et al. |
| 2005/0243759 | A1 | 11/2005 | Torarp et al. |
| 2006/0072453 | A1 | 4/2006 | Olariu et al. |
| 2007/0002868 | A1 | 1/2007 | Qian et al. |
| 2007/0004404 | A1 | 1/2007 | Buckley et al. |
| 2007/0155489 | A1 | 7/2007 | Beckley et al. |
| 2008/0046963 | A1 | 2/2008 | Grayson et al. |
| 2008/0123660 | A1 | 5/2008 | Sammour et al. |
| 2008/0178251 | A1 | 7/2008 | Shin |
| 2008/0221951 | A1 | 9/2008 | Stanforth |
| 2008/0222019 | A1 | 9/2008 | Stanforth |
| 2008/0222020 | A1 | 9/2008 | Stanforth |
| 2008/0222021 | A1 | 9/2008 | Stanforth |
| 2008/0240034 | A1 | 10/2008 | Gollamudi |
| 2009/0023458 | A1 | 1/2009 | Mountney |
| 2009/0137227 | A1 | 5/2009 | Bencheikh |
| 2009/0154351 | A1 | 6/2009 | Kim et al. |
| 2009/0154413 | A1 | 6/2009 | Kim et al. |
| 2009/0157880 | A1 | 6/2009 | Lee et al. |
| 2009/0161540 | A1 | 6/2009 | Zaki et al. |
| 2009/0197597 | A1* | 8/2009 | Kotecha ........................ 455/433 |
| 2009/0270099 | A1* | 10/2009 | Gallagher et al. ......... 455/435.1 |
| 2009/0325585 | A1 | 12/2009 | Farajidana et al. |
| 2010/0135205 | A1 | 6/2010 | Li et al. |
| 2010/0195583 | A1 | 8/2010 | Nory et al. |
| 2010/0240384 | A1 | 9/2010 | Nobukiyo |
| 2010/0284278 | A1* | 11/2010 | Alanara ........................ 370/235 |
| 2012/0026947 | A1 | 2/2012 | Miller et al. |
| 2012/0028626 | A1 | 2/2012 | Marocchi et al. |
| 2012/0040667 | A1* | 2/2012 | Foresti et al. ................. 455/433 |

FOREIGN PATENT DOCUMENTS

| | | | |
|---|---|---|---|
| EP | 2026514 | A1 | 2/2009 |
| EP | 2124386 | A1 | 11/2009 |
| WO | 0127644 | A1 | 4/2001 |
| WO | 0156323 | A1 | 8/2001 |
| WO | 2004030393 | A1 | 4/2004 |
| WO | 2009090582 | A1 | 7/2009 |
| WO | 2009141016 | A1 | 11/2009 |

OTHER PUBLICATIONS

PCT International Search Report Dated Oct. 27, 2011 for Counterpart Application.

"3rd Generation Partnership Project: Technical Specification Group Services and System Aspects; Policy and Charging Control Architecture (Release 10)"; 3GPP Standard; 3GPP TS 23.203, 3rd Generation Partnership Project (3GPP); Mobile Competence Centre; France; No. V10.0.0; Jun. 10, 2010; p. 1-126; XP050441553.

"3rd Generation Partnership Project: Technical Specification Group Core Network and Terminals; Policy and Charging Control (PCC) Over S9 Reference Point; Stage 3 (Release 9)"; 3GPP Standard; 3GPP TS 29.215, 3rd Generation Partnership Project (3GPP); Mobile Competence Centre; France; No. V9.3.0; Jun. 18, 2010; p. 1-36; XP050441929.

Ericsson: "Role of the VPCRF", 3GPP Draft; S2-080103_PC-CQOS_008_Discussion VPCRF Role, 3rd Generation Partnership Project (3GPP); Mobile Competence Centre, France; Vol. SAWG2, No. Marina Del Rey; 20080109; Jan. 9, 2008; XP050262634.

3GPP TS 23.203 v9.2.0 Technical Specification; 3rd Generation Partnership Project; Technical Specification Group Services and System Aspects; Policy and Charging Control Architecture (Release 9); Sep. 2009; 120 pages; www.3gpp.org.

"3rd Generation Partnership Project : Technical Specification Group Services and System Aspects; Policy and Charging Control Architecuture (Release 10)", 3GPP Standard; 3GPP TS 23.203, 3rd Generation Partnership Project (3GPP), Jun. 10, 2010, No. V10.0.0, pp. 1-126.

Notice of Allowance mailed on Dec. 28, 2011, in United States, for related U.S. Appl. No. 12/648,476, Anatoly Agulnik, filed Dec. 29, 2009.

International Search Report and Written Opinion for International Application No. PCT/US2010/059392 mailed on Mar. 4, 2011.

"ARP Value Range" Motorola, 3GPP Draft; S2-085782 ARP Value Range in EPS—Dicsussion, 3rd generation Partnership Project (3GPP), vol. SA WG2, No. Sophia, Aug. 19, 2008.

Polk et al. "A Resource Reservation Protocol (RSVP) Extension for the Reduction of Bandwith of Reservation Flow", RFC 4495, Network Working Group, Cisco Systems, May 2006.

Nichols et al. "A Two-Bit Differentiated Services Architecture for the Internet", RFC 2638 , Network Working Group, Cisco, Jul. 1999.

Non-Final Office Action mailed on Jan. 24, 2012, in United States, related U.S. Appl. No. 12/643,085, Ramandeep Ahuja, filed Dec. 21, 2009.

International Search Report and Written Opinion for related International Application No. PCT/US2010/058627 mailed on Feb. 18, 2011.

Salami G., et al., "Non Pool Based Spectrum Sharing for Two UMTS Operators in the UMTS Extension Band", IEEE, Mobile VCE Research Group, Center for Communication Systems Research, 2008.

Garcia et al., "Comparison of Spectrum Sharing Techniques for IMT-A Systems in Local Area Networks," Vehicular Technology Conference, Apr. 26-29, 2009, pp. 1-5.

Non-Final Office Action mailed Apr. 26, 2013 in U.S. Appl. No. 12/848,121, Trent J. Miller, filed Jul. 31, 2010.

Final Office Action mailed Feb. 27, 2013 in U.S. Appl. No. 12/848,121, Trent J. Miller, filed Jul. 31, 2010.

Notice of Allowance mailed on Mar. 28, 2012, in United States, for related U.S. Appl. No. 12/648,476, Anatoly Agulnik, filed Dec. 29, 2009.

Notice of Allowance mailed on Jun. 4, 2012, in United States, for related U.S. Appl. No. 12/643,085, Ramandeep Ahuja, filed Dec. 21, 2009.

International Search Report and Written Opinion for International Application No. PCT/US2011/042502 mailed on Oct. 27, 2011.

Non-Final Office Action mailed Sep. 7, 2012 in U.S. Appl. No. 12/848,121, Trent J. Miller, filed Jul. 31, 2010.

Final Office Action mailed Sep. 9, 2013 in U.S. Appl. No. 12/848,121, Trent J Miller, filed Jul. 31, 2010.

Office Action mailed Jul. 19, 2013 in European Patent Application No. 10795116.2.

Lao, L. et al., "Reducing Multicast Traffic Load for Cellular Networks using Ad Hoc Networks," Proceedings of the 2nd International Conference on Quality of Service in Heterogeneous Wired/Wireless Networks (Qshine' 05), IEEE, Aug. 22, 2005, pp. 10.

FRF.16.1—Multilink Frame Relay UNI/NNI Implementation Agreement, Frame Relay Forum for inverse multiplexing over FR, Editor Mike Sheehan, May 2002, pp. 1-40.

Newman, S., 700 MHz D Block RFP, "Public Safety Interoperable Communications and the 700 MHz D Block Proceeding," Jul. 30, 2008, Retrieved from the Internet URL:: http://transition.fcc.gov/realaudio/presentations/2008/073008/newman.pdf on Aug. 14, 2014, pp. 1-30.

Office Action mailed Apr. 12, 2013 in Mexican Patent Application No. 12007195.

Office Action mailed Nov. 12, 2013, in counterpart Australian Patent Application No. 2010340233.

Office Action mailed Dec. 11, 2013, in counterpart Australian Patent Application No. 2010340233.

Office Action mailed Jan. 30, 2014, in counterpart Australian Patent Application No. 2011286379.

Office Action mailed Mar. 19, 2014, in counterpart Mexican Patent Application No. MX/A/2013/001214.

Office Action mailed Mar. 31, 2014, in counterpart Australian Patent Application No. 2011286381.

(56) References Cited

OTHER PUBLICATIONS

Office Action mailed Apr. 4, 2014, in counterpart Mexican Patent Application No. MX/A/2013/001213.
Notice of Allowance mailed May 22, 2014, in counterpart Australian Patent Application No. 2011286381.
Office Action mailed May 23, 2014, in counterpart Mexican Patent Application No. MX/A/2013/001213.
Notice of Allowance mailed Jul. 15, 2014, in counterpart Australian Patent Application No. 2010340233.
Office Action mailed Jun. 12, 2014, in counterpart European Patent Application No. 10791030.9.

* cited by examiner

POLICY DETERMINATION FOR USER EQUIPMENT PROVIDNG MUTUAL AID IN A VISITED ENTERPRISE OPERATING AREA OF A LONG TERM EVOLUTION SYSTEM

REFERENCE TO RELATED APPLICATIONS

The present application is related to the following U.S. applications commonly owned together with this application by Motorola, Inc.:

Ser. No. 12/848,121, filed Jul. 31, 2010, titled "Location Based Policy for User Equipment Operating in Different Areas of a Shared Home Long Term Evolution System" by Miller, et al.

TECHNICAL FIELD

The technical field relates generally to communication systems and more particularly to policy determination for user equipment providing mutual aid in a visited enterprise operating area of a Long Term Evolution system.

BACKGROUND

Long Term Evolution (LTE) is a $4^{th}$ generation (4G) of radio technologies designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and published by $3^{rd}$ Generation Partnership Project (3GPP), with the most recent version of the 3GPP TSs being published in March 2010 as a revised "Release 9" (with Release 10 currently being developed).

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®.

Most major carriers in the United States (US) and several worldwide carriers began plans to convert their networks to LTE beginning in 2010. In addition, state and local public safety agencies in the US (including US Intelligence Services) have endorsed LTE as the preferred technology for the new 700 MHz public safety radio band. Moreover, multiple public safety agencies (and/or enterprises other than public safety) may share a home LTE system for, among other reasons, cost effectiveness, wherein each separate enterprise is associated with a different enterprise operating area (EOA) in the shared LTE system. In addition, multiple public safety agencies or enterprises having different enterprise operating areas in one or more LTE systems may have responders that provide mutual aid for a visited enterprise operating area.

Thus, there exists a need for location based policy for user equipment operating in different enterprise operating areas of a shared home Long Term Evolution system and there exists a need for policy determination for user equipment providing mutual aid in a visited enterprise operating area of a Long Term Evolution system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
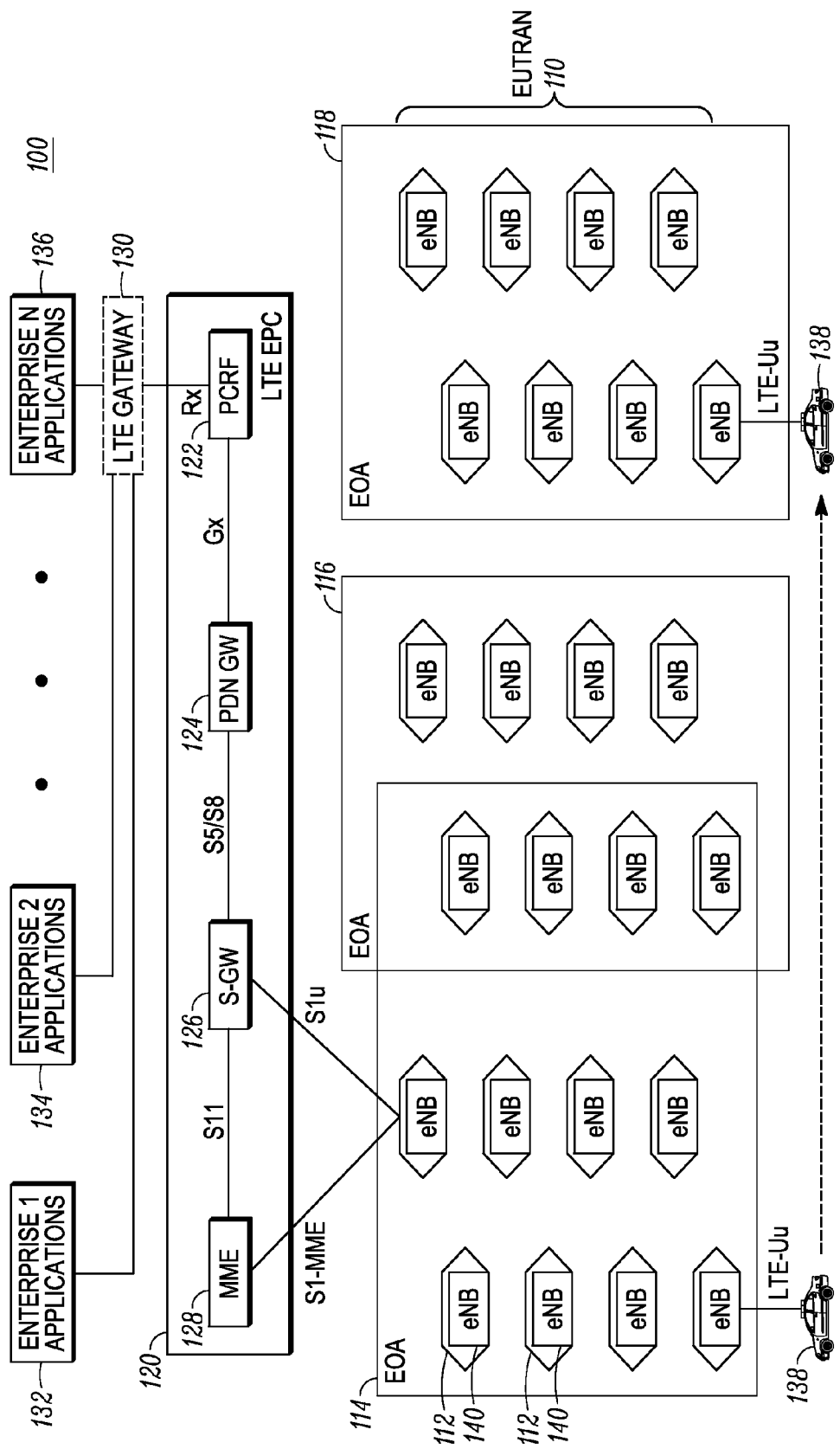
FIG. 1 is a system diagram of a communication system that implements location based priority for user equipment operating in different areas of a shared home Long Term Evolution system and that implements policy determination for user equipment providing mutual aid in a visited enterprise operating area of a Long Term Evolution system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to one embodiment, a policy determination function (such as a Policy and Charging Rules Function in an LTE system): detects a trigger, and responsive to the trigger, determines a first enterprise operating area in which a UE is currently located, wherein the first enterprise operating area is one of a plurality of enterprise operating areas of the LTE system; and determines whether the first enterprise operating area is a home enterprise operating area or a visited enterprise operating area for the UE, wherein the home enterprise operating area is allocated to a home enterprise with which a user of the UE is associated, and the visited enterprise operating area is allocated to a visited enterprise. When the first enterprise operating area is the home enterprise operating area, the policy determination function selects a first set of policy rules for the UE; and when the first enterprise operating area is the visited enterprise operating area, the policy determination function selects a second set of policy rules for the UE.

If the home enterprise and the visited enterprise have a trust relationship or the user of the UE and the visited enterprise have a trust relationship or the user of the UE and a user associated with the visited enterprise have a trust relationship, the policy determination function selects a third set of policy rules for the UE while the UE is operating in the first enterprise operating area. The third set of policy rules provides at least one of a higher bearer allocation and retention priority or a higher scheduling priority than the second set of policy rules.

Primarily, a responder and the responder's UE(s) are assigned to a single "home" agency and each agency has at least one enterprise operating area, but in some cases the responder may belong to multiple agencies. When the UE(s) used by a responder are located in the responder's home enterprise operating area, they receive favorable Quality of Service (QoS) from the LTE Evolved Packet System (EPS). In some cases, such as traveling to court or home, the responder may leave their home enterprise operating area. In such cases when the responder's UE leaves its home enterprise operating area, in accordance with the present disclosure, the UE's Quality of Service attributes or parameters (such as Allocation and Retention Priority (ARP), QoS Class Identifier (QCI), Maximum Bit Rate (MBR), Guaranteed Bit Rate (GBR), etc.) may be altered; potentially less favorably.

In accordance with a second embodiment, a Mutual Aid QoS Function (MAQF) receives an indication that a UE is assigned to provide mutual aid in a mutual aid enterprise operating area, wherein the UE has a home enterprise operating area that is different than the mutual aid enterprise operating area; detects that the UE has entered the mutual aid enterprise operating area; and selects a set of mutual aid policy rules for the UE while the UE is providing mutual aid in the mutual aid enterprise operating area. In accordance with this embodiment, responders and their associated UE(s) may be asked to leave their home enterprise operating area and perform mutual aid assistance in a visited enterprise operating area. In such cases, policy for the responder's UE(s) is not adjusted less favorably as the responder leaves its home enterprise operating area. Instead, the responder's UE(s) receive favorable mutual aid policy for the duration of the mutual aid response.

These embodiments provide enterprises, such as public safety agencies, more control over allocation of policy in their home enterprise operating area so as give their users a higher priority for bearer allocation and retention and scheduling over users associated with other enterprises. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes elements of: an access network (in this case a radio access network (RAN)) 110 that includes a plurality of cells 112 each having an eNodeB (LTE base station) infrastructure device 140; and an LTE Evolved Packet Core (EPC) 120 having a number of logical elements (including an infrastructure Policy Determination Function 122 (which in this case is a Policy and Charging Rules Function (PCRF)), an infrastructure Policy Enforcement Function 124 (which in this case is a Packet Data Network Gateway (PDN GW)), a Serving Gateway (SGW) 126, and a Mobility Management Entity (MME) 128). In general, the EPC and the RAN are referred to collectively, herein, as the LTE system and are referred to in the art as an Evolved Packet System. System 100 further comprises a plurality of enterprise applications 132, 134, and 136 and a UE 138, which can communicate using the LTE system. The system 100 optionally includes an LTE gateway 130 interfacing the applications 132, 134, 136 with the policy definition function 122. The elements of communication system 100 and the interfaces between them are next described.

The RAN 110 elements, EPC 120 elements, and UE 138 implement protocols and signaling in accordance with LTE TSs; and the terms LTE communication system, LTE system, and EPS are used interchangeably herein and are each defined as being inclusive of the RAN 122 and the EPC 110 but not inclusive of the enterprise applications or the UE. Moreover, only a limited number of EPC elements and enterprise applications, and a single UE and RAN are shown in the diagram, but more such elements may be included in an actual commercial or private system implementation. Also, the RAN can be any type of access network, including any 2G, e.g., Global System for Mobile Communication (GSM) or 3G, e.g., Universal Mobile Telecommunications System (UMTS), access network.

In general, the UE 138, the EPC 120 logical elements, and the RAN 110 elements are each implemented using (although not shown) a memory, one or more network interfaces, and a processing device that are operatively coupled, and which when programmed form the means for these system elements to implement their desired functionality, for example as illustrated by reference to the methods and additional diagrams shown in FIG. 2 to FIG. 6. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by UE 138, the EPC 120 logical elements, and the RAN 110 elements may be programmed with software or firmware logic or code for performing functionality described by reference to FIG. 2 to FIG. 6; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods illustrated in FIGS. 2 to 6. The UE 138, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users). Moreover, the UE communicates its signaling with an eNodeB via an LTE-Uu interface or reference point.

In this illustrative implementation, multiple enterprises share the same LTE system having a single LTE core (also termed herein "a shared home LTE system"). An enterprise, as the term is used herein, means an organization having applications and users of UE that communicate using the shared home LTE system, and can be, for example, a public safety enterprise or agency or a commercial enterprise, agency or business. Each enterprise typically operates applications, Internet Protocol (IP) transport equipment, and devices. The network devices operated by each enterprise include a suitable interface, memory, and processing device that runs various applications (e.g., applications 132, 134, 136) accessible by UE over the LTE system. Such applications include, but are not limited to, PTT services, PTV (Push-to-Video) services, PTX (push-to-anything) services via uncast or multicast, Telephony services, computer aided dispatch (CAD), media distribution, etc.

The EPC 120 is an all-IP core network that provides mobile core functionality that, in previous mobile generations (2G, 3G), has been realized through two separate sub-domains: circuit-switched (CS) for voice and packet-switched (PS) for data. The EPC 120 enables the above-mentioned all IP end-to-end delivery of media: from mobile handsets and other user equipment with embedded IP capabilities, over IP-based encodes, across the EPC and throughout the application domain, IMS (IP Multimedia Subsystem) and non-IMS.

As mentioned above, The EPC 120 comprises the logical components of the PCRF 122, the PDN GW 124, the SGW 126, and the MME 128, and further comprises the, respective, interfaces (also referred to in the art as reference points) between these logical entities. These interfaces include an Rx interface between the LTE gateway 130 (or between the applications 132, 134, 136 when no gateway function is present) and the PCRF 122; a Gx interface between the PCRF 122 and the PDN GW 124, an S5 or S8 interface between the PDN GW 124 and the SGW 126; an S11 interface between the SGW 126 and the MME 128; an S1u interface between the SGW and encodes; and an S1-MME interface between the MME and encodes.

The logical entities of the EPC 120 are shown as separate logical blocks and indeed can, in some embodiments, each be included in separate hardware devices or can, alternatively, be combined in one or more hardware devices. Also, the EPC 120, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 120 are not shown in FIG. 1 for the sake of clarity.

Turning first to the PCRF 122, this infrastructure element stores policies and makes policy decisions and transfers those policies to the PDN GW where they are enforced. The PCRF 122 receives information from other infrastructure elements and/or the UE in system 100 and/or has therein information that enables the PCRF to determine or select one or more (i.e., a set of) policy rules for UE attaching to the LTE system. In accordance with embodiments of the present disclosure, the PCRF 122 is enhanced above standard LTE PCRF elements in that it implements methods and signaling in accordance with the teachings herein, and, in one illustrative implementation, in accordance with the method and message sequence charts illustrated in FIG. 2 to FIG. 4, described in more detail below.

The LTE gateway 130 enables the enterprise applications 132, 134, 136 (for enterprises 1 to N) to communicate with the PCRF 122 without modifying the interfaces at the application side and may include a location server. The LTE gateway 130 may include a location server to provide location indications to the PCRF 122 to facilitate the teachings herein. In general, the PCRF can obtain location information for a user's (e.g., responder's) UE from a variety of sources including, but not limited to, infrastructure provided location (e.g., LTE Location Control Service (LCS), a release 9 infrastructure system, or an application server); and UE provided location (e.g., Global Positioning System (GPS) coordinates).

The PDN GW 124 supports service data flow (SDF) detection, policy enforcement and flow-based charging. This infrastructure element also provides connectivity to the UE to external packet data networks by being the point of exit and entry of traffic for the UE, and also acts as the anchor for mobility between 3GPP and non-3GPP technologies such as WiMAX and 3GPP2 (CDMA 1X and EvDO). The SGW 126 routes and forwards user point-to-point data packets, while also acting as the mobility anchor for the user plane during inter-eNodeB handovers and as the anchor for mobility between LTE and other 3GPP technologies. The MME 128 is the key control-node for UE access on the LTE system. It is involved in the bearer activation/deactivation process and is also responsible for choosing the SGW for a UE at the initial attach and is further responsible for authenticating the user (by interacting with a home subscriber server (HSS), not shown).

As used herein, the term bearer or bearer resource is defined as a transmission path in a network (such as a RAN) and is used to carry UE data traffic (also termed, herein, as communications or service data flows). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the applications and a downlink path from the applications to the UE; or a bearer can be unidirectional, such as a common point-to-multipoint (PTM) downlink path from the applications to the UE for MBMS traffic. A bearer can be point-to-point (PTP) (such as a dedicated bearer or a default bearer), or a PTM bearer (such as a MBMS bearer) and has associated therewith a set of characteristics or attributes including, but not limited to, QoS, a carrier frequency at which data is modulated, a particular bandwidth, bit rate, etc. A default bearer is defined as a non-GBR bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

RAN 110 in this embodiment is a E-UTRAN (Evolved UMTS Terrestrial Radio Access Network) comprising multiple cells 112 each served by an eNodeB 140, which serve as the intermediate infrastructure device between the UE and the EPC 120 and a point of access for the UE to allocated bearers. Each cell represents a geographic coverage area that provides the wireless resources termed herein as bearers for carrying data (or SDFs) for UE connected to the RAN. Each cell is defined as being inclusive of a single eNodeB's coverage area or a portion of an eNodeB's coverage area and can be identified by a cell identifier. Pursuant to this understanding of the relationship between cells and encodes, within this text the terms "cell" and "eNodeB" may be used on occasion interchangeably, without loss of clarity. In addition, the abbreviation eNB may be used in lieu of eNodeB.

Moreover, the physical RAN is divided into a plurality of logical (EOAs) (with an EOA also referred to herein, interchangeably, as a jurisdiction), wherein each EOA is defined by a geographic boundary that includes one or more cells or portions of cells or sectors of the RAN 110. Each EOA has a different geographic boundary. However, one or more of the EOAs can have overlapping geographic boundaries. In this illustrative description, the geographic boundaries of EOAs are defined at the cell level, but further precision or granularity may be used to define these boundaries such as, for instance, through the use of mapping coordinates, a network-based LTE LCS that is currently being written into the LTE TSs, geographic or geographical information systems (GIS), GPS coordinates, and the like. RAN 110 is shown, for illustrative purposes, as comprising three such enterprise operating areas, EOA 114, EOA 116, and EOA 118, wherein EOAs 114 and 116 have overlapping boundaries.

In addition, each EOA is associated with, allocated to, or assigned to at least one enterprise, which provides application services to a plurality of users and their UE and serves as their home enterprise. If not identified as a home enterprise for a particular UE, all other enterprises for the UE are considered visited enterprises. Generally, a particular enterprise serves as a home enterprise for UE that normally receives application services from that enterprise (e.g., because of a relationship such as an employment agreement between the user and the enterprise).

In addition, the EOA allocated or assigned to the home enterprise of a user and associated UE is considered the home EOA for that user/UE; all other EOA outside of the jurisdictional boundary of the user/UE's home EOA are considered a visited EOA for the user/UE. Moreover, a given user/UE can be associated with or assigned to one or more home EOAs. The home EOA for a user/UE can be identified by an EOA identifier or jurisdictional identifier, which is mapped at least to the UE in the LTE system so that a determination, based on UE location, can be made as to whether a UE is in its home EOA or outside of its home EOA for implementing the teachings herein.

In addition, besides home EOAs and visited EOAs for a UE, also referred to herein are mutual aid EOAs and transit EOAs. A mutual aid EOA is defined as a visited EOA for a UE, wherein the user/UE is assigned to provide mutual aid or assistance in that visited EOA. A transit EOA is defined as any visited EOA that a UE traverses while traveling from its home EOA to a mutual aid EOA. By reference to FIG. 1, if Enterprise 1 is the home enterprise for UE 138 and EOA 114 is its home EOA, and further if Enterprise N is the mutual aid enterprise for UE 138 and EOA 118 is the mutual aid EOA, then Enterprise 2 is a transit enterprise for UE 138 and EOA 116 is the corresponding transit EOA.

Figure 2:
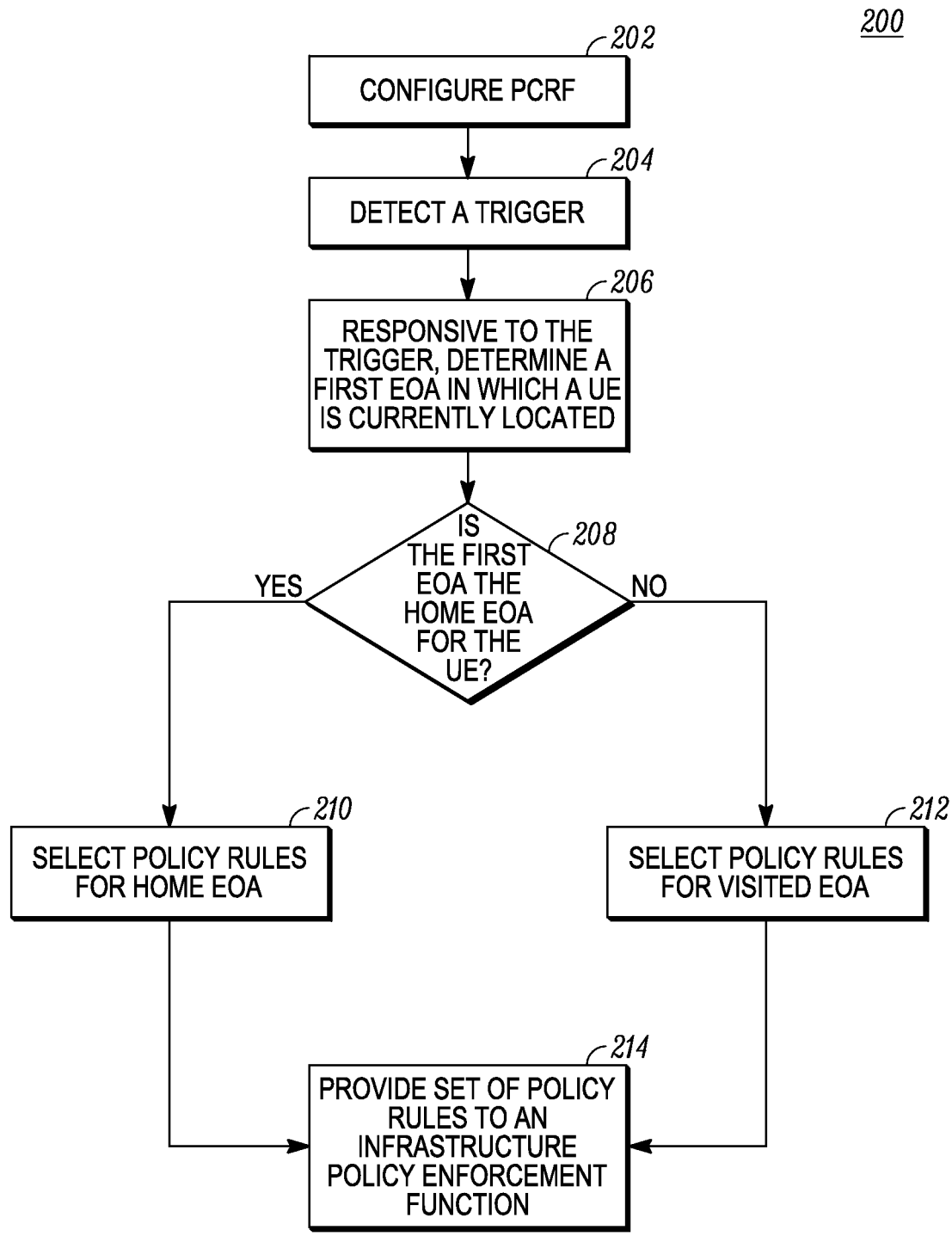
FIG. 2 is a flow diagram of a method for location based priority for user equipment operating in different areas of a shared home Long Term Evolution system in accordance with some embodiments.

Turning now to FIG. 2, a method for location based priority for user equipment operating in different areas of a shared home Long Term Evolution system is shown and generally indicated at 200, wherein method 200 is performed by a policy determination function, such as the PCRF 122 shown in FIG. 1. To further facilitate understanding of the teachings herein, method 200 is described in conjunction with the message sequence charts (MSCs) 300 and 400 illustrated, respectively, in FIG. 3 and FIG. 4. MSC 300 illustrates messaging sent between a PDN GW 302, a PCRF 304, a location server 306, and a configuration server 308 to implement embodiments of the present disclosure. MSC 400 illustrates messaging sent between a PDN GW 402, a PCRF 404, a location server 406, and a configuration server 408 to implement embodiments of the present disclosure.

Figure 3:
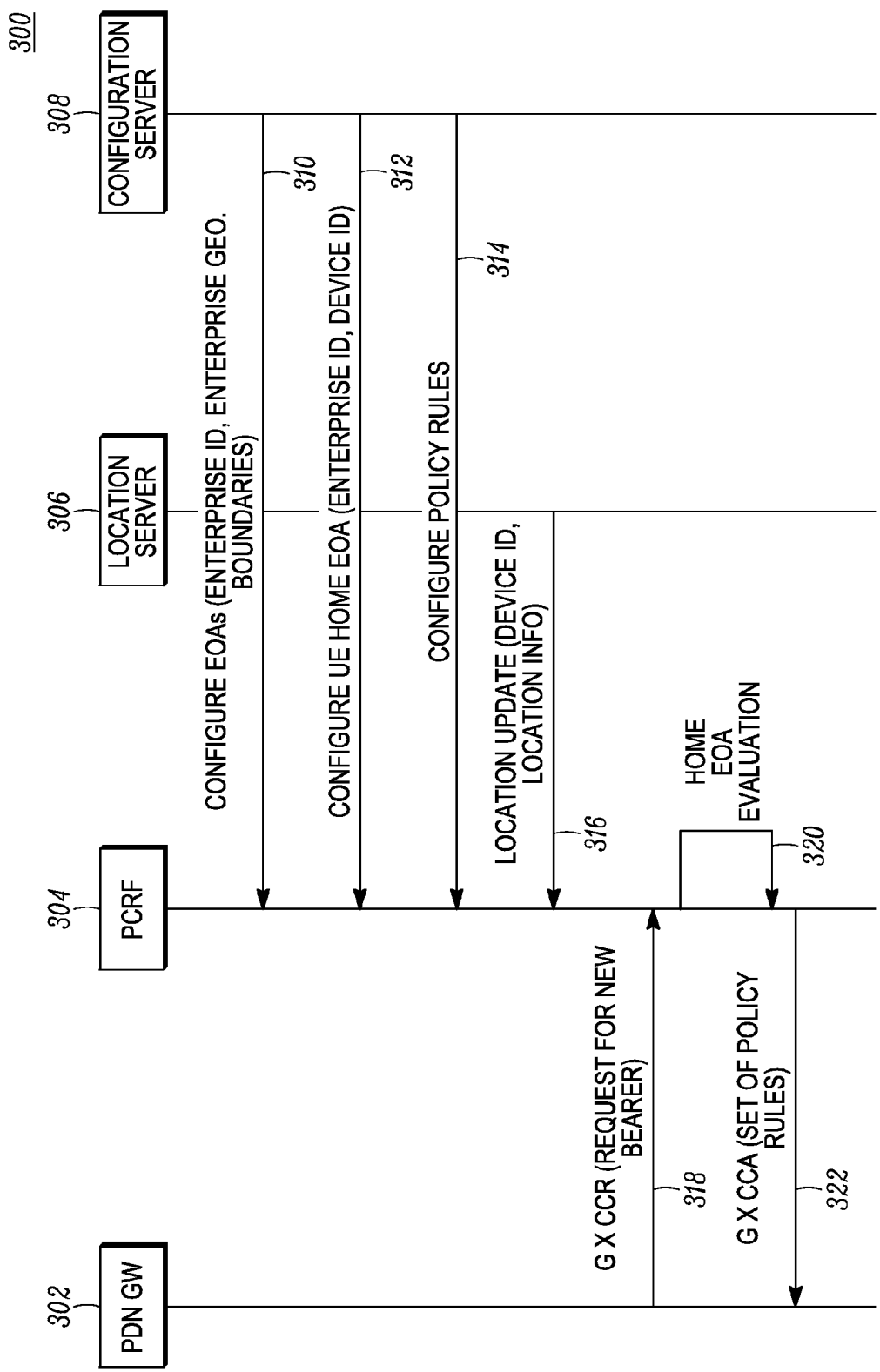
FIG. 3 is a message sequence chart that facilitates location based priority for user equipment operating in different areas of a shared home Long Term Evolution system in accordance with some embodiments.
Figure 4:
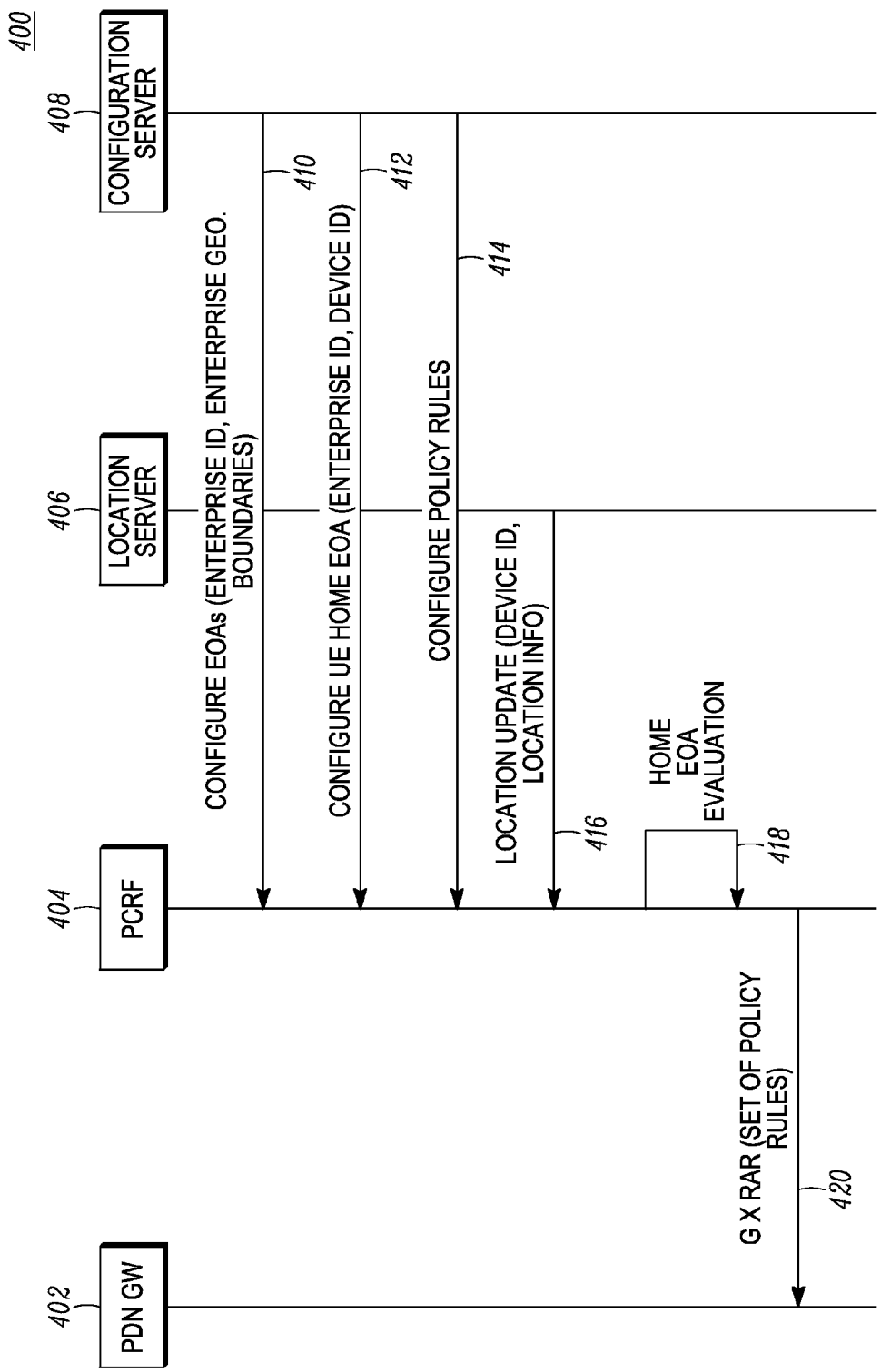
FIG. 4 is another message sequence chart that facilitates location based priority for user equipment operating in different areas of a shared home Long Term Evolution system in accordance with some embodiments.
Figure 5:
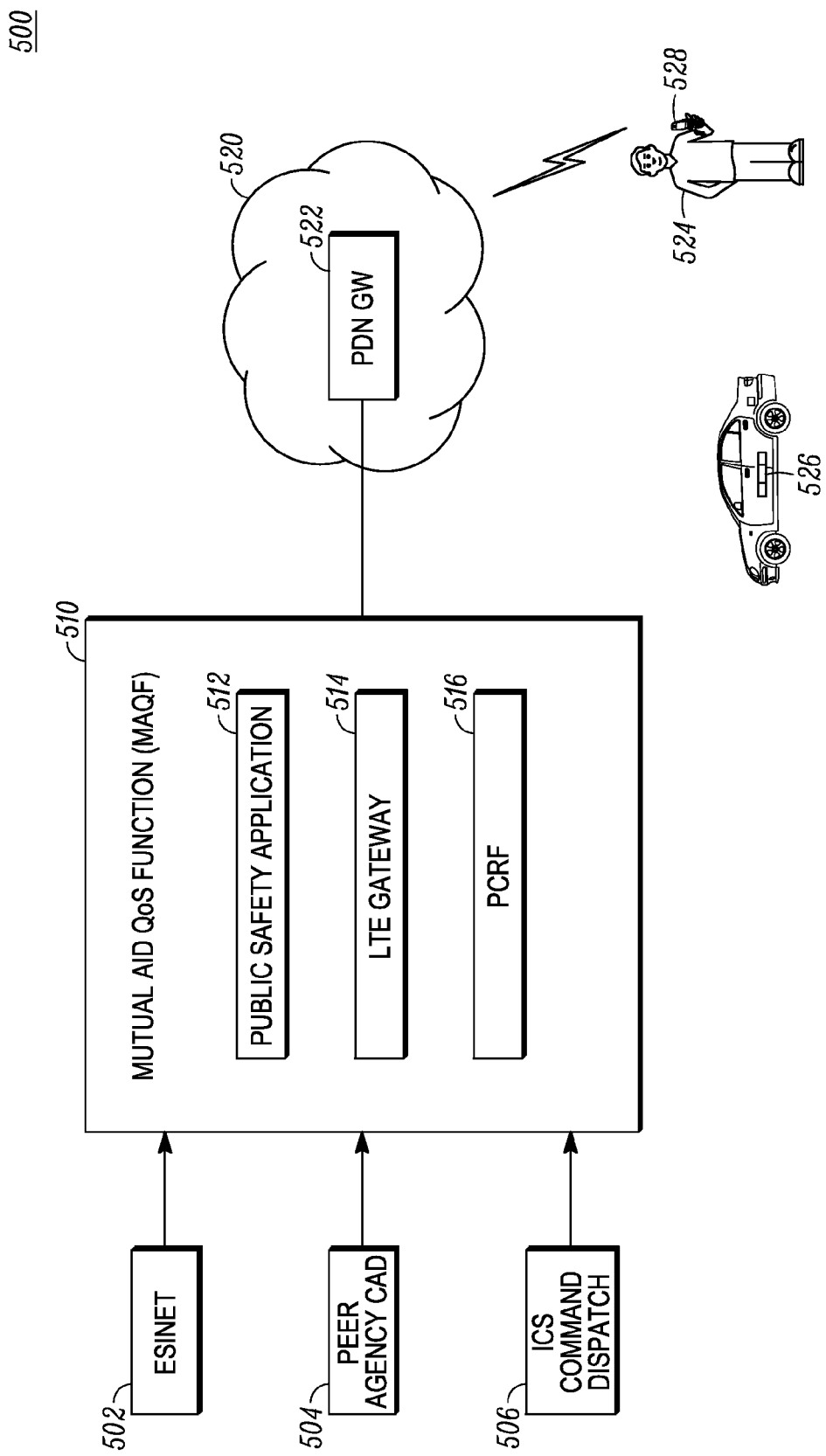
FIG. 5 is a block diagram illustrating parts of a communication system for implementing policy determination for user equipment providing mutual aid in a visited enterprise operating area of a Long Term Evolution system in accordance with some embodiments.
Figure 6:
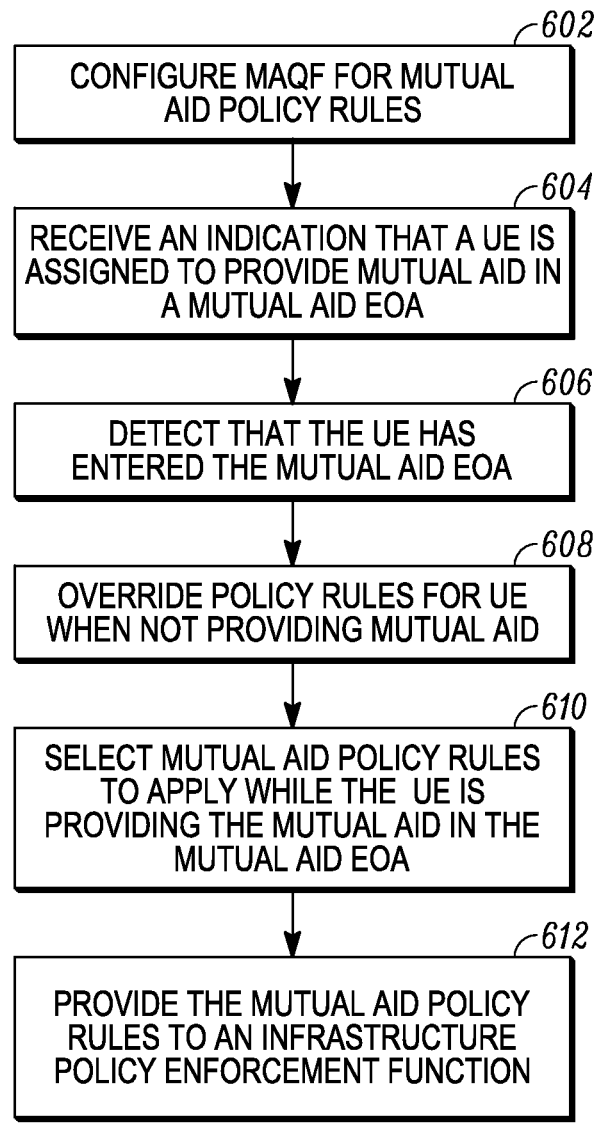
FIG. 6 is a flow diagram of a method for policy determination for user equipment providing mutual aid in a visited enterprise operating area of a Long Term Evolution system in accordance with some embodiments.

The embodiment of the present disclosure described by reference to FIG. 2 to FIG. 4 is referred to herein as the "jurisdiction priority" embodiment for ease of reference. Another embodiment of the present disclosure described by reference to FIG. 5 and FIG. 6 is referred to herein as the "mutual aid" embodiment for ease of reference, and is later described. In accordance with the jurisdictional priority embodiment, policy for a UE is determined based on whether the UE is located within the jurisdictional boundaries of its home EOA or outside of those boundaries (i.e., within a visited EOA). In this manner, UE operating in their home EOA receive priority over other UE that happen to be in the same area, but who are out of their normal home EOA by providing different levels of Quality of Service (QoS) with respect to, for example, at least one of bearer allocation and retention, scheduling priority for packets, level of performance of SDFs, admission priority, packet latency, packet loss rate, effective bandwidth, minimum bandwidth, or maximum bandwidth. QoS, and hence priority, is determined or quantized based on one or more QoS parameters included in a set (i.e., one or more) of policy rules (e.g., Policy and Charging Control (PCC) rules) selected for the UE, wherein the policy rules may include one or more of QoS rules or parameters, billing and charging rules, authorization rules or rules about which applications can be used, and which types of bearers may or may not be established or are allowed to be established or allocated to the UE in an EOA.

Returning to method 200 of FIG. 2 by further reference to MSC 300, at 202, the PCRF 304 is configured to enable it to determine policy rules for one or more UE. This involves, at the least, messaging 310 to configure the EOAs into the PCRF 304, messaging 312 to configure UE/home EOA bindings into the PCRF 304 (such bindings may be stored at a HSS or a subscription profile suppository (SPR) and then transferred to the PCRF), and messaging 314 to configure UE policy rules into the PCRF 304. In one illustrative implementation, when configuring the EOAs into the PCRF 304, the configuration server 308 and/or a network operator, for example, configures the definition of each EOA for the LTE system, including a jurisdictional identifier for the EOA. The configuration server functionality can be included in any device that provides the configuration information needed by the PCRF, such as the HSS, the SPR, the LTE gateway 130, a network operator, etc. Regarding the EOA boundaries, in one example, the configuration server specifies the geographic area or boundaries of an EOA by identifying cells that define the boundary of the EOA as either border cells (i.e. cells that define the edge of the EOA) or interior cells (i.e. cells that are not part of the edge of the EOA), wherein it is possible for an agency to be comprised exclusively of border cells. The specified geographic boundary for an EOA is mapped to the identifier for the EOA and provided (310) to the PCRF 304.

The configuration server 308 (which in this case could collectively include the HSS and/or the SPR) configures the PCRF 304 with UE/home EOA bindings by providing to the PCRF 304, in messaging 312, the jurisdictional identifier(s) that have been assigned to each UE operating on the shared LTE system. Thus, a binding between the UE (e.g., that is identified by an identifier for the UE and/or its user, which could be, for example, one or more of an International Mobile Subscriber Identity (IMSI), a Push-to-Talk (PTT) identifier, Mobile Station Integrated Services Digital Network (MSISDN) number, a telephone number, a private user identity, a user name, a unit name, a role identifier, and agency identifier, etc.) and their assigned home EOA (identified by the EOA identifier) is stored in the PCRF 304.

When providing (314) the policy rules to the PCRF 304 for each UE, in one implementation, the configuration server 308 provides, for each UE, a device identifier mapped to or otherwise associated with one or more home EOA QoS and charging policies and one or more visited (or non-home) EOA QoS and charging policies. Generally, these policy rules are determined by the home enterprise. In one example implementation, each EOA has a generic policy for any responder (user) and their UE that is not home to that EOA (i.e., the policy for "roamers"), which is likely assigned by each home EOA (i.e., how to handle roamers). The policy rules can be pushed to the PCRF from the LTE gateway 130 and/or from a HSS; and in at least one embodiment the policy rules can be determined by agreement between a home and visited enterprise. Moreover, the policy rules may be applicable to single SDFs, applications, and devices as allowed in the LTE TSs, but the policy rules can also be applied to roles, incidents, groups, etc, which is not provided for in standard LTE.

To determine policy rules for a given UE at any given point in time, the UE's location is needed. Accordingly, the location server 306 provides to the PCRF 304 in messaging 316 an indication of the UE's location, which the PCRF can use to determine an EOA in which the UE is currently located. UE location is provided periodically, as needed, and/or with some frequency determined by other factors such as the particular location technique being used. In addition, the PCRF 304 can poll the location server 306 for UE location indications or other location information, for example, in response to a Gx CCR message (e.g., messaging 318). In the messaging 316, the UE location is tied to the UE identifier for recognition and storage at the PCRF 304.

As used herein, a location server is generically defined as a device that provides information regarding a UE's location (i.e., that provides location indications that can be translated into a location for the UE). The location indications can, for instance, include one or more of: an indication from the infrastructure, such as the RAN of a cell or sector change for the UE, an indication from a GPS or GIS service of a location change for the UE, an indication from the UE of a location change. One or more devices in the communication system can perform as a location server or perform location server functionality or support the reporting of UE location including, but not limited to the UE, the encodes, the MME, the SGW, the PGW, and the LTE gateway 130.

For instance, in one implementation, upon initial attachment, the PCRF subscribes to Gx location change events from the PDN GW. In another example implementation, the PCRF regularly polls a Gateway Mobile Location Center at the MME for LTE LCS location information. Alternatively, the UE pushes location information (e.g., its GPS coordinates) down to the PCRF via the LTE gateway 130, to name a few location reporting options. It should be noted that messaging 410, 412, 414, and 416 shown in MSC 400 is similar to the corresponding messaging 310, 312, 314, and 316 of MSC 300 described above and is, therefore, not repeated here for the sake of brevity. Moreover, messaging 310 to 316 and 410 to 416 can be any suitable messaging including modified messages from the LTE TSs or proprietary messaging.

Returning momentarily to method 200 of FIG. 2, detecting (204) a trigger starts a process or evaluation (functions 206 to 212) to determine the applicable policy rules for a UE, based on the UE's location. In a first implementation (illustrated by the MSC 300), the trigger comprises a request from the UE to establish a new dedicated bearer. The trigger could, alternatively, comprise a request for a bearer for the UE that is sent by an entity other than the UE. In this illustrative implementation, the request is included in a Gx CCR message 318 sent from the PDN GW 302 to the PCRF 304; and this triggers an evaluation 320 at the PCRF 304. In a second implementation (illustrated by the MSC 400), the trigger comprises the location indication 416 sent from the location server 406 to the PCRF 404, which indicates a change in location for the UE, and which triggers an evaluation 418 at the PCRF.

The evaluation (320, 418) involves the PCRF 304 retrieving the location information (e.g. current cell information, location coordinates, etc.) for the UE via polling or as already stored, wherein the location information can be determined or translated from a location indication from the location server; and based on this location information, determining (206) the current EOA in which the EOA is operating, and determining (208) whether the current EOA is the home EOA for the UE or a visited EOA. For example, the PCRF 304 determines whether the UE's current location (e.g., as translated or identified by the location indication) is within the geographical boundary of the UE's home EOA. If not, then it is determined that the UE is "out of home" or in a visited EOA.

In the simplest implementation, there are two sets of policy rules for a UE, one set that is selected, obtained, or determined (210) when the UE is in its home EOA and one set that is selected (212) when the UE is in a visited EOA; and the selected set of policy rules is passed or pushed or provided to a policy enforcement function, e.g., the PDN GW, if necessary. Each set of policy rules is determined, for example, by the home enterprise and includes one or more QoS parameters that control QoS, and hence priority, for the UE operating in its home EOA versus a visited EOA. More particularly, in accordance with the teachings herein, there is a change in or difference in at least one QoS parameter between the set of policy rules for the UE in the visited EOA and its home EOA. This change or difference in QoS parameters causes the UE to have a higher priority, e.g., one or more of a higher bearer allocation and retention priority, a higher scheduling priority, or a higher level of performance of SDFs in its home EOA over a visited EOA. Essentially, when a UE is outside of its home EOA and the UE is not supporting "Mutual Aid" (described in detail later), the UE is performing "jurisdictional roaming" (within the single home LTE system), and its QoS characteristics or parameters are adjusted (typically lowered) by the PCRF to favor the UE in its home EOA. Within a regional public safety network, for example, this feature creates geographic areas in which a broadband device receives favorable QoS as defined by the device's home agency. Outside the device's agency area, the broadband device may or may not receive favorable QoS.

In one implementation, the QoS parameters (included in the policy rules for the UE) comprise any combination of the following EPS bearer parameters: QCI, ARP, GBR, and MBR. The QCI parameter controls bearer scheduling priority. The ARP parameter controls bearer allocation and retention priority, and the GBR and MBR parameters control level of performance of the SDF while sent over the LTE system. Other possible QoS parameters include, but are not limited to, per APN (access point node) Aggregate Maximum Bit Rate (APN-AMBR) and per UE Aggregate Maximum Bit Rate (UE-AMBR).

The QCI is a scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the access node (e.g. eNodeB). The ARP contains information about priority level (scalar), pre-emption capability (flag) and pre-emption vulnerability (flag). The primary purpose of ARP is to decide whether a bearer establishment/modification request can be accepted or needs to be rejected in case of resource limitations (typically available radio capacity in case of GBR bearers). The priority level information of the ARP is used for this decision to ensure that the request of the bearer with the higher priority level is preferred. In addition, the ARP can be used (e.g. by the eNodeB) to decide which bearer(s) to drop during exceptional resource limitations (e.g. at handover). The pre-emption capability information of the ARP defines whether a bearer with a lower ARP priority level should be dropped to free up the required resources. The pre-emption vulnerability information of the ARP defines whether a bearer is applicable for such dropping by a pre-emption capable bearer with a higher ARP priority value.

Once successfully established, a bearer's ARP does not have any impact on the bearer level packet forwarding treatment (e.g. scheduling and rate control). Such packet forwarding treatment is determined by the other EPS bearer QoS parameters, e.g., QCI, GBR and MBR, and by the AMBR parameters. The GBR denotes the bit rate that can be expected to be provided by a GBR bearer. The MBR limits the bit rate that can be expected to be provided by a GBR bearer (e.g. excess traffic may get discarded by a rate shaping function). The APN AMBR is a subscription parameter stored per APN in the HSS. It limits the aggregate bit rate that can be expected to be provided across all non GBR bearers and across all PDN connections of the same APN that is being accessed by a specific UE. The UE AMBR limits the aggregate bit rate that can be expected to be provided across all non GBR bearers of a UE. Thus, the GBR and MBR denote bit rates of traffic per bearer while UE-AMBR and APN-AMBR denote bit rates of traffic per group of bearers. Each of those QoS parameters has an uplink and a downlink component.

Returning again to the evaluation (320, 418) performed by the PCRF to determine (208) whether the UE is in its home or a visited EOA and to accordingly select (210, 212) the appropriate set of policy rules for the UE, the following illustrative analysis can be implemented. For a UE exiting its home EOA, the QCI, ARP, MBR, and GBR QoS parameters are adjusted in a less favorable manor (or possibly the UE's flows are preempted). Conversely, when the UE returns to its home EOA the QCI, ARP, MBR, and GBR QoS parameters are adjusted more favorably. When the location indication provided to the PCRF indicates a cell location change for a UE, the PCRF's jurisdictional priority logic is triggered. If the cell is part of the interior or border cell list as configured for the UE's agency/EOA, the PCRF examines the UE's "in use" policy rules (i.e. what the PCRF last sent to the PDN GW) to see if they indicate "in jurisdiction" QoS. If not, "in jurisdiction" policy rules are selected (210) and provided (214) to the PDN GW via any suitable messaging (e.g., messaging 322 of MSC 300 and messaging 420 of MSC 400.

The messaging can be proprietary or compatible with a standardized message, such as messages defined in the LTE TSs. In one illustrative LTE implementation, when the trigger for the evaluation comprises the UE requesting a bearer allocation (FIG. 3) the PCRF sends the policy rules to the PDN GW in a Gx CCA message over the Gx interface. When the trigger for the evaluation comprises a location update for the UE (FIG. 4), the PCRF sends the policy rules to the PDN GW in a Gx RAR message over the Gx interface.

If the cell reported by LTE is not in either the interior or border cell list as configured for the UE's agency/EOA, the PCRF examines the UE's "in use" policy rules (i.e. what the PCRF last sent to the PDN GW) to see if they indicate "out of jurisdiction". If not, "out of jurisdiction" policy rules are selected (212) and pushed to the PDN GW. The PCRF tracks all active bearers for a UE (ingress and egress). Given the UE's identifier, home agency, and role, a pre-configured table is consulted in the PCRF, which determines the applications requiring policy rule adjustment for jurisdictional changes.

In another illustrative implementation, the out of jurisdiction or out of EOA policy rules for a UE are determined based on an agreement between the home enterprise and the visited enterprise for the UE by virtue of an existing trust relationship that identifies the UE as being "trusted" or known by the visited enterprise, for purposes of applying the set of agreed upon policy rules. Thus, the policy rules for the UE in the visited EOA for this implementation generally provide a higher priority or QoS (e.g., a higher allocation and retention priority, a higher scheduling priority, and/or a higher level of SDF performance, etc.) than the policy rules where no such agreement or trust relationship exists (or where the UE is not trusted or known by the visited enterprise). Thus, in this implementation, the QoS parameters included in the set of policy rules for a UE in a visited EOA (jurisdiction) can be determined by the PCRF based on an agreement between the UE's home enterprise (agency) and the visited agency.

For example, it is typically the case that some visiting UE get preferential treatment when operating in a jurisdiction in which they have previously worked or are known through some other means. In such a case, the UE and/or users of the UE are "friendly" with (i.e. trusted by or have a trust relationship with) a visited agency (i.e., the agency allocated to or assigned the visited jurisdiction) or friendly with users of the visited agency. For instance, the user may know the standard operating procedures of the visited agency, and can more naturally work along side the users in that agency, thereby, providing some level of trust between parties, which warrants the UE having an elevated priority over the priority it would have absent such a trust relationship or agreement between the agencies.

This "intermediate" approach to jurisdictional priority is beneficial in a number of use case scenarios. For example, State Police regularly travel across municipal and county jurisdictions in non-mutual aid situations. It would, therefore, be reasonable for the State Police to be provided, via policy rules, preferential "roaming" service within the shared home LTE system. In addition, cross jurisdictional politics are generally such that some enterprises have better relationships with each other than with other enterprises; and it would, again, be reasonable to offer a higher QoS when traveling between the jurisdictional coverage areas of these agencies, even when not in a mutual aid situation.

More particularly, the intermediate jurisdictional priority implementation enables multiple levels of inter-agency friendliness for jurisdictional priority policies and operations, by (a) creating and maintaining a multi-tier database, (b) accessing and updating the database, and (c) providing for associated messaging. Regarding the creation and maintenance of the database, in general, the database includes, at a minimum, a plurality of entries, wherein each entry maps a set policy rules (e.g., one or more QoS parameters such as ARP, etc.) to different home enterprise/visiting enterprise pairs, for example, based on an agreement between the enterprises. Thus, a table of agencies could be created identifying friendly agencies, and differing QoS (ARP, etc.) values for each combination of friendly agencies.

The database could have a variety of structures such as a matrix structure, as depicted in Table 1.

TABLE 1

| Inputs | | Outputs | | |
|---|---|---|---|---|
| | | | Home Agencies | |
| Visiting Agency | P.ARP | Visiting | Agency 1 | Agency 2 | Agency N |
| Agency 1 | 1 | 5 | — | 3 | — |
| Agency 1 | 4 | 11 | — | 7 | — |
| Agency 1 | 12 | 15 | — | 14 | — |
| Agency 2 | 3 | 9 | 4 | — | 6 |
| Agency 2 | 12 | 15 | 14 | — | 12 |
| Agency 2 | 15 | 15 | 15 | — | 15 |
| Agency N | 1 | 5 | — | 3 | — |
| Agency N | 3 | 8 | — | 6 | — |
| Agency N | 4 | 12 | — | 8 | — |
| Agency N | 15 | 15 | — | 15 | — |

Or the database could have a more traditional database structure, as depicted in Table 2 below.

TABLE 2

| Query | | | Result |
|---|---|---|---|
| Home Agency | Visited Agency | GW.ARP | Q.ARP |
| Agency 1 | Agency 2 | 1 | 2 |
| Agency 1 | Agency 2 | 4 | 4 |
| Agency 1 | Agency N | 8 | 15 |
| Agency 2 | Agency N | 3 | 4 |
| Agency 2 | Agency 1 | 12 | 12 |
| Agency 2 | Agency N | 15 | 15 |
| Agency N | Agency 1 | 1 | 6 |
| Agency N | Agency 1 | 3 | 12 |
| Agency N | Agency 2 | 4 | 4 |
| Agency N | Agency 2 | 15 | 15 |

In the implementation having the traditional database structure, the database is actually broken into two tables, Table 2 and a "Default" table, Table 3 (below). Initially, Table 2 is queried based on the Home Agency, the Visited Agency, and the LTE Gateway (GW) requested QoS parameter (which in this example implementation is ARP), for instance, for a UE bearer request. If Table 2 contains an entry for the given agencies and LTE Gateway requested ARP, the Result set indicates a QoB (Q) ARP to apply to the request. For example, a request from a UE homed on Agency 1 and visiting Agency 2 with a LTE Gateway requested ARP of 1 would return row 1 in Table 2, with the Result being a QoB ARP of 2.

In another example, a request from a UE homed on Agency 1 and visiting Agency 2 with a LTE Gateway requested ARP of 11 would fail since there is no row in the table that contains all three parameters. In this case, the Result set is empty, so the PCRF consults the Default Visitor's Table 3. Queries into this table do not include the home agency of the requester. The failed request from above would be run against the default table, wherein Visited Agency 2 and GW.ARP 11 returns a Q.ARP of 13. It is expected that all combinations of Agency, GW.ARP and Q.ARP are present in this default table, thereby, making a failed query an exceptional error.

TABLE 3

| Visited Agency | P.ARP | Q.ARP |
|---|---|---|
| Agency 2 | 11 | 13 |
| Agency 2 | 4 | 4 |
| Agency N | 8 | 15 |
| Agency N | 3 | 4 |
| Agency 1 | 12 | 12 |
| Agency N | 15 | 15 |
| Agency 1 | 1 | 6 |
| Agency 1 | 3 | 12 |
| Agency 2 | 4 | 4 |
| Agency 2 | 15 | 15 |

The examples shown above are for three agencies where Agency 1 & 2 are friendly, and Agencies 2 & N are friendly, so the priority (e.g., QoS parameter) values are higher for operations when a user from one of these agencies visits the jurisdiction of another agency. Note that we are using ARP in this example as the representative priority value. However, other suitable parameters include, but are not limited to, QCI, TOS (type of service), GBR, MBR, delay specifications, packet loss specification, preemptability status, etc. This could extend not only to just normal visiting operations (e.g., data), but also to Emergency, Mutual Aid, Applications (e.g., MVS—mobile video service, etc.), call type (e.g., voice, video, etc.), call parameters (e.g., X Mbps, Y packets per second, etc.), other scenarios, and the like.

There are a number of ways in which the database could be populated. In one implementation, the database is automatically generated with default priority values upon the provisioning of a new agency, or the database could be explicitly created when two "friendly" agencies determine agreed upon policies. In a further implementation, priority values for some entries are left blank (signifying "best effort" status), or some entries could be created to indicate an unfriendly status for a set of agencies so that no service is allowed, which may be a mechanism beyond what normal provisioning may allow (for instance, such provisioning could indicate—do not allow service to users of a particular agency under certain roaming and scenario conditions, which is more restrictive than allowing them best effort status). Additionally, database optimization can be provided for sets of friendly agencies, e.g., agency pools or agency groups or "super-agencies", which have similar or the same policies. This would add a level of hierarchy (tiering) to the database structure, and result in more complex queries. Moreover, known methods of accessing and updating the database can be used.

Next described is the messaging associated with the system scenarios and above-described database methods. When a UE attempts to initiate a service (e.g., via a request for a bearer), the LTE system sends the appropriate messaging to the LTE Gateway and the PCRF, with the appropriate information elements (e.g., service request, request for bearer, unit identifier, etc.). The PCRF not only determines the "home" or "visiting" status and set of policy rules for the UE, but it also determines (e.g., looks up in the database) a list of agencies which have jurisdiction in this location. The PCRF further looks up the friendliness association with the requesting UE's agency to the possibly multiple agencies that are friendly, determines (from the database) the resultant policy (e.g., ARP QoS value), and chooses the highest QoS value (in the examples, 1 is highest). Other mechanisms could be implemented, such as, if this location is part of M jurisdictions, and the UE's agency is friendly with all agencies that have this jurisdiction, then choose the highest (or lowest, or average, etc.) QoS value; or if there are some agencies that have jurisdiction at this location with which the visiting UE is not friendly, retrieve the default QoS values. Messages carrying the resultant values are then sent to the functions and/or devices (e.g., PCRF, LTE Gateway, PDN GW, UE, eNodeB, etc.) for their use and processing.

For example, assume the following jurisdictions for the listed agencies of Table 4 below.

TABLE 4

| Agency | Jurisdiction |
| --- | --- |
| Agency 1 | South, West |
| Agency 2 | West, Central |
| Agency N | East |

In this example, a PCRF determines that a UE of Agency N has entered into the West region, and further determines (e.g., using Table 4) that Agencies 1 & 2 have jurisdiction in the West, or in other words has the West as part of their enterprise operating area. The PCRF identifies Agency N as friendly with Agency 2. Therefore, the PCRF selects from the database the set of one or more policy rules for the UE, which were determined or agreed upon based on the trust relationship or friendliness between Agency N and Agency 2. As can be seen from the previous example, the determination of the resultant priority is not necessarily a straight database lookup, but involves other algorithms and decision making processing around the information resulting from database accesses and queries.

Further enhancements to the intermediate jurisdictional priority implementation can be realized to accommodate more granular location of the UEs. For example, each agency could have multiple jurisdictions (as shown in Table 4 above), and each jurisdiction could have multiple locations (sectors on an eNodeB). The policies can be set up such that modified ARP values (or other resultant QoS parameters) are used for friendly agencies in one or more particular jurisdictions, but not others, or specific locations, but not others. For example, if a UE from Agency N is in Agency 2's West Jurisdiction, then higher ARP values are used, but if the same UE from Agency N is in Agency 2's Central Jurisdiction, use the default visitor ARP.

In a further illustrative implementation, types of agencies are classified to further facilitate the order of searching for policy. For example for public safety, at a location, which is within multiple jurisdictions, there is one Police force that has jurisdiction, one Fire department that has jurisdiction, one Public Service agency which has jurisdiction, etc. So, if the visiting UE is of type Police, the PCRF first checks the Home Police friendliness policies. This does not preclude the case that the visiting (Police) UE could be friendly with the home Fire agency.

It should be noted again that the above tables merely provide an example database implementation. Those examples show Agencies in the database. However, the tables/database could be created more granular, e.g., down to the individual UE and, thus, storing unique policy rules for each UE. Moreover, the above example tables provide for explicit QoS parameter values pre-provisioned within entries of the database. However, an alternative implementation is to simply store whether agencies are friendly, and for every friendly agency within a jurisdiction (location), the resultant priority is raised by one (or N), up to a set maximum, or something not-to-exceed the priority of the agency homed there.

In a further "on-demand" implementation scenario, a set of policy rules is requested by a UE. Accordingly, upon entering a visited EOA and starting a service, the UE can request of a particular agency (or all agencies that have jurisdiction at that location) that the policies for the UE be set or modified in a certain way. This can, for instance, be based on a trust relationship between a user of the UE and the visited agencies, such as a police chief from a police agency of a particular EOA requesting elevated QoS in neighboring visited police agency jurisdictions.

In addition, for certain scenarios (e.g., large, multi-agency incident scenes), there could be an "override" to disable the additional functionality put forth in this disclosure, i.e., to ignore all the columns except for the Visiting column in the database. This override could be scenario based, functionality based, under operator control, dependent on system conditions (e.g. a certain level of loading, or under failure conditions, etc.), and the like. Moreover, the above database examples used to describe intermediate jurisdictional priority applies to a UE initiated service. These examples further apply to network initiated services (e.g., from a console, a server, etc.) to a single destination UE, where the analysis is performed based on the location of the destination UE.

Furthermore, given the nature of the information in the database (namely, which pairs of agencies are friendly and how friendly they are), the trust between agencies can be transferred. As an example, suppose a UE's home agency is unknown to an agency that has requested mutual aid (i.e., a mutual aid agency), and the UE was not assigned for the mutual aid; but the PCRF is aware that the mutual aid agency is friends with some other agency that is friends with the UE's home agency. Trust can, thereby, be transferred to create a trust relationship between the UE or the UE's home agency and the mutual aid agency, to elevate the priority level of the UE by changing QoS parameters for the UE. However, since the trust is effectively two hops away, a limitation can be place on how high policy (priority) can be raised for the UE.

In accordance with another illustrative implementation, a set of policy rules for a UE (having a home EOA) is determined based on a trust relationship between a user of the UE and a user from a visited EOA. This implementation applies to a group of two or more users, where the users are from or associated with different agencies in different jurisdictions. As an example, a group, Group G, is created with a user from Agency 1 (using a UE1) and a user from Agency 2 (using a UE2), to allow UE1 and UE2 to more effectively communicate (and not necessarily for "group communications," i.e., multicast or one-to-many communications). In accordance with the present disclosure, policy for Group G is provisioned into the database to establish priorities and scenarios for this group. Note that the group is not an agency, and each user is still part of their home agency; therefore, a UE can be associated to one agency and one or more groups simultaneously.

In operation, when UE1 makes a service request to UE2 (or to Group G), the PCRF checks the database, in whatever order has been established, and determines that the database and the policies contain group associations for these units. The set of policy rules for Group G is, therefore, selected and provided to the PDN GW. A specific jurisdictional priority case may be that UE1 is attempting to communicate with UE2, and UE1 is out of UE1's agency's jurisdiction, but is not friendly with UE2's agency. Per the current or normal jurisdictional priority scenario, the PCRF would select the visiting ARP value for UE1. However, when it is determined that both UE1 and UE2 are part of Group G, and Group G's Visiting ARP is higher than the already determined ARP for visiting UE1, the PCRF selects Group G's visiting ARP for the service between UE1 and UE2.

Based on the above description, the net result in a jurisdictional priority scenario is the possibility of one or more policy rules getting modified at the PDN GW by the PCRF. This use case is unique in that it utilizes specialized location information, as well as jurisdiction mapping to cell/sector (or other granularity) to define priorities for enterprise (e.g., public safety) user flows. This allows the LTE system to assess the current congestion of the EOA, to manage the priorities of the flows within that EOA, and to re-prioritize and/or preempt flows in order to give priority to the home jurisdiction users. Thus, coupling of the geo-location and affiliation of the user to allocation of over-the-air and network resources per EOA is a unique aspect to this embodiment.

Next described is the mutual aid embodiment of the present disclosure. Mutual aid defines the ability to override the "normal" visited jurisdictional QoS and priorities (e.g., based on a set of policy rules) for users (e.g., Public Safety responders) using their UE to provide mutual aid, wherein mutual aid is defined as assistance for an incident, event, or occurrence outside of the home jurisdiction for a user/UE. As referred to herein, the "normal" policy rules for a visited EOA comprise the set of policy rules that are applied to a user and UE in the visited EOA in accordance with the jurisdictional priority embodiment, when the user is not invited into a visited jurisdiction to support mutual aid. When an incident occurs that requires multiple agency responses, and some of the responders are considered roaming into the jurisdiction (i.e., visiting or roaming responders) where the incident is located (called the mutual aid jurisdiction or mutual aid EOA), those mutual aid roaming responders (and their UE) need to have communication with mutual aid jurisdiction responders, and, as such, need priorities for their flows that allow for this communication.

This is important, for example, in scenarios where there is congestion in the mutual aid jurisdiction, and the visiting users need to communicate with the mutual aid jurisdiction responders to coordinate for the incident. An example scenario for this use case is where multiple fire departments are dispatched to the same location to battle a large blaze. Some of the fire fighters are in their home jurisdiction, and some are not. The mutual aid embodiment would essentially provide an "override" for jurisdictional priority policy rules when users are out of their home jurisdiction. The mutual aid agency, generally, defines the policy rules for the visiting responders providing mutual aid, for instance, to allow the visiting responders to fit into the mutual aid agency's prioritization hierarchy. The visiting responders can be from a different EOA of a shared home LTE system with the mutual aid EOA or from an EOA of a different LTE system altogether.

Turning now to FIG. 5, a block diagram illustrating parts of a communication system for implementing policy determination for UE providing mutual aid in a visited EOA of an LTE system is shown. In accordance with an implementation, a mutual aid analysis is performed by a Mutual Aid QoS Function (MAQF) 510 for a mutual aid enterprise and corresponding mutual aid EOA. MAQF 510 includes one or more of an application (512) (e.g., a Public Safety application such as a CAD function of the mutual aid agency, an Incident Command (ICS Command) system of the mutual aid agency, a location service, or any other suitable application function providing services for Public Safety users); an LTE gateway 514; and a PCRF 516. The public safety application(s) 512, LTE gateway 514, and PCRF 516 can be physically embodied as described above by reference to similar infrastructure elements shown in FIG. 1, thereby, comprising at least a memory, interface, and processing device configured or programmed for with functionality in accordance with the present teachings.

In accordance with the teachings herein, when a mutual aid trigger is provided to the MAQF 510, for example, by a user (potential responder to the mutual aid incident) or by an application function external to the MAQF 510 (e.g., from an ESINET function 502 or other Next Generation 911 (NG911) function of a different agency, a CAD function 504 of a different agency, an ICS command dispatch function 506 of a different agency, etc.), the MAQF 510 performs a method to determine the policy for users and UE operating on the LTE system in the mutual aid jurisdiction. In one illustrative implementation, the MAQF performs a method 600 shown in FIG. 6 to determine mutual aid policy rules, defined as a set of policy rules for visiting responders and UE providing mutual aid in a mutual aid jurisdiction. The mutual aid policy rules are pushed to an infrastructure policy enforcement function (e.g., PDN GW 522) in an LTE EPS 520 for a user and UE, such as a user 524 and her UE 526, 528.

Turning now to a description of the method 600, say, for instance, user 524 is on duty in her home jurisdiction and is carrying devices 526 and 528 for communications. According to jurisdictional priority, responder 524 and her UE would be provided the home jurisdiction priority based on a set of home jurisdiction QoS parameters. Then an incident occurs in a jurisdiction other than the user's home jurisdiction (i.e., the mutual aid jurisdiction), wherein the user is invited (e.g., dispatched or assigned) to provide mutual aid to the mutual aid jurisdiction.

In one illustrative implementation, the MAQF 510 is provisioned (602) with mutual aid policy rules for responders providing mutual aid in the mutual aid jurisdiction. Provisioning can occur by an operator in the mutual aid agency or some suitable configuration server (for instance, a configuration server as described above). As mentioned earlier, the mutual aid policy rules are typically defined by the mutual aid jurisdiction to provide control to the mutual aid agency over the resources of it EOA. The set of mutual aid policy rules can be common for all visiting responders or customized as necessary. Moreover, the mutual aid policy rules may cause the visiting responders to have the same or substantially the same QoS as responders having the mutual aid jurisdiction as their home jurisdiction, or the mutual aid policy rules may simply allow the visiting responders to maintain the QoS provided in their home jurisdiction.

The set of mutual aid policy rules for visiting users/UE comprises a set of QoS parameters such as, for instance, QCI, ARP, GBR, MBR, etc.; and the mutual aid policy rules provide for a change to at least one QoS parameter over the normal visiting user policy rules and can also control whether or not bearers for certain applications can be used at all (for example, the mutual aid EOA may only want the visiting mutual aid responder to use voice and non-video data services but not video services. This change in QoS parameters provides for an elevated priority over the normal policy for the visiting responder including, but not limited to, a higher bearer allocation and retention priority, a higher scheduling priority, or a high performance level for SDFs, and can be applied to all of the applications or only a subset of the applications used by the visiting UE, and may also optionally degrade performance to some applications to elevate performance of others. The mutual aid policies can be stored at the public safety application 512 or the LTE gateway 514 and later pushed to the PCRF 516 during a mutual aid scenario or stored at the PCRF 516 and updated when needed.

Upon the responder 524 and UE 526, 528 being assigned to provide mutual aid, an inter-agency communication is performed to enable the home agency for the user 524 to provide (604) an indication that one or more responders have been assigned to assist in the mutual aid jurisdiction. The indication can be provided by a CAD-to-CAD communication or any other home agency application function-to mutual aid application function communication. The indication provided by the home agency identifies the users and associated UE (in this case, at least the user 524 and her devices 526, 528) that have been sent to provide mutual aid. The indication, and thereby identification, of the roaming responders can be via any suitable identifier or combination of identifiers assigned to the UE (e.g., a device identifier such as an IMSI, PTT identifier, MSISDN, Uniform Resource Identifier (URI), Uniform Resource Locator (URL), a telephone number, and the like) or the user (e.g., a user identifier such as a user name, role identifier, etc.). The identifiers and corresponding policy rules for the user and UE are pushed to the PCRF for use when the roaming mutual aid responders enter the mutual aid jurisdiction.

The MAQF 510 detects or is informed (606) when the UE (e.g., 526, 528) enters the mutual aid jurisdiction. This can be provided for by a location server (as described above) using a location indication that is translated into a location change for the UE 526, 528. The location indication can originate from the UE or from the infrastructure using any of the above-mentioned location techniques, for example. The location indication can be done automatically or can be the result of the MAQF 510 polling a location server, for instance in response to a bearer request for the UE 526, 528.

The location change update triggers the MAQF 510 to perform a mutual aid policy determination function. For example, a mutual aid CAD function (512) determines that the responder 524 entering the mutual aid jurisdiction is a roaming mutual aid responder and not just a regular visiting user and, thereby, instructs the PCRF 516 to select (610) the mutual aid policy rules for this responder, to provide (612) to the PDN GW 522. These rules may be equivalent to one or more of: the UE's home policy rules; the home policy rules of a UE home to the mutual aid EOA; or a dedicated mutual aid set of policies. Alternatively, if the mutual aid policy rules are not pre-stored at the PCRF, the CAD function or the LTE gateway provides the mutual aid policy rules to the PCRF with the instruction to select them for the responder. In any event, the net result is that the PCRF overrides or disables (608) the normal visited QoS parameters for the user/UE 524, 526, 528 (i.e., the policy rules when the responder is not providing mutual aid).

The mutual aid policy rules can be applied to newly requested bearers resulting from bearer requests by the UE 526 and 528 or on behalf of the UE by a different device (e.g., a network initiated bearer request) and can be applied to existing bearers. The mutual aid policy rules likely result in a higher QoS than normal for the UE in the visited mutual aid jurisdiction or may result in new bearers being initiated or can, optionally, launch mutual aid applications for responding devices. Moreover, usually, the mutual aid policy rules are applied for the UE 526, 528 as long as the visiting responder continues to provide mutual aid and/or the incident concludes. At the conclusion of the incident, priority for the visiting responder reverts back to the normal QoS.

Also, as mentioned above, the responder and UE may traverse one or more transit jurisdictions en route to the mutual aid jurisdiction and may need to communicate with the mutual aid agency en route. Thus, another aspect of the present disclosure is the provision of elevated QoS for mutual aid responders en route to the mutual aid jurisdiction, which would provide a higher QoS for those responders than would normally be provided in the visited transit jurisdiction. The QoS can result from a set transit policy rules set by the transit jurisdiction for all responders in transit to a mutual aid jurisdiction or may simply allow the in-transit responder to maintain home EOA QoS. Of course, some inter-agency communication must be provided between the home agency and the transit agency to enable a transit EOA MAQF to detect that an in-transit responder has entered the transit jurisdiction and to select and apply the in-transit policy rules for the responder.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for policy determination for user equipment providing mutual aid in visited EOA of a Long Term Evolution system described herein. The non-processor circuits may include, but are not limited to, a radio receiver, a radio transmitter, signal drivers, clock circuits, power source circuits, and user input devices. As such, these functions may be interpreted as steps of a method to perform the policy determination for user equipment providing mutual aid in a visited EOA of a Long Term Evolution system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a Mutual Aid QoS Function (MAQF) for determining policy for user equipment (UE) providing mutual aid for public safety purposes in a mutual aid enterprise operating area of a shared Long Term Evolution (LTE) system, wherein the LTE system comprises a core network that provides service to a plurality of radio access networks, the method comprising:
  receiving, by the MAQF, an indication that a UE is assigned to provide mutual aid in a mutual aid enterprise operating area, wherein the UE has a home enterprise operating area that is different than the mutual aid enterprise operating area, wherein the enterprise operating areas of both the home enterprise operating area and the mutual aid enterprise operating area are of the shared LTE system, and wherein each enterprise operating area of the home enterprise operating area and the mutual aid enterprise operating area is associated with a one or more different radio access networks of the plurality of radio access networks;
  detecting that the UE has entered the mutual aid enterprise operating area;
  selecting a set of mutual aid policy rules for the UE while the UE is providing mutual aid in the mutual aid enterprise operating area, wherein the set of mutual aid policy rules are different from, and provide a different level of service than, a set of policy rules applied to non-mutual aid users equipment (UEs) visiting the radio access networks associated with the mutual aid enterprise operating area.

2. The method of claim 1, wherein receiving the indication that the UE is assigned to provide mutual aid comprises receiving a device identifier for the UE assigned to provide the mutual aid.

3. The method of claim 1, wherein receiving the indication that the UE is assigned to provide mutual aid comprises receiving a user identifier for a user of the UE assigned to provide the mutual aid.

4. The method of claim 1, wherein detecting that the UE has entered the mutual aid jurisdiction comprises receiving an indication of a location change for the UE.

5. The method of claim 1, wherein the set of mutual aid policy rules matches a set of policy rules for at least one other UE having the mutual aid enterprise operating area as its home enterprise operating area.

6. The method of claim 1, wherein the set of mutual aid policy rules matches a set of policy rules for the UE when the UE is operating in its home enterprise operating area.

7. The method of claim 1 further comprising overriding a second set of policy rules for the UE when the UE is operating in the mutual aid jurisdiction but not assigned to provide mutual aid.

8. The method of claim 7, wherein the mutual aid set of policy rules includes a set of mutual aid Quality of Service (QoS) parameters, and the second set of policy rules includes a second set of QoS parameters, wherein the set of mutual aid QoS parameters comprises a change to at least one QoS parameter in the second set of QoS parameters.

9. The method of claim 8, wherein the set of mutual aid QoS parameters provides for at least one of a higher bearer allocation and retention priority or a higher scheduling priority than the second set of QoS parameters.

10. The method of claim 1 further comprising providing the set of mutual aid policy rules to an infrastructure policy enforcement function.

11. The method of claim 1, wherein the UE is allocated a new bearer upon entering the mutual aid enterprise operating area, and the set of mutual aid policy rules is applied to the new bearer.

12. The method of claim 1, wherein the UE has an existing bearer upon entering the mutual aid enterprise operating area, and the set of mutual aid policy rules is applied to the existing bearer.

13. The method of claim 1 further comprising:
  detecting that the UE has entered a transit enterprise operating area en route to the mutual aid enterprise operating area;
  selecting a set of in transit policy rules for the UE while the UE is operating in the transit enterprise operating area.

14. A system to perform a method performed by a Mutual Aid QoS Function (MAQF) for determining policy for user equipment (UE) providing mutual aid for public safety purposes in a mutual aid enterprise operating area in a shared Long Term Evolution system, wherein the LTE system comprises a core network that provides service to a plurality of radio access networks, the system for determining the policy comprising:

a processing device that is configured to,
receive, by the MAQF, an indication that a UE is assigned to provide mutual aid in a mutual aid enterprise operating area, wherein the UE has a home enterprise operating area that is different than the mutual aid enterprise operating area, wherein the enterprise operating areas of both the home enterprise operating area and the mutual aid enterprise operating area are of the shared LTE system, and wherein each enterprise operating area of the home enterprise operating area and the mutual aid enterprise operating area is associated with a one or more different radio access networks of the plurality of radio access networks;
detect that the UE has entered the mutual aid enterprise operating area;
select a set of mutual aid policy rules for the UE while the UE is providing mutual aid in the mutual aid enterprise operating area, wherein the set of mutual aid policy rules are different from, and provide a different level of service than, a set of policy rules applied to non-mutual aid users equipment (UEs) visiting the radio access networks associated with the mutual aid enterprise operating area; and
an interface that is configured to provide the selected set of mutual aid policy rules to an infrastructure policy enforcement function in the LTE system.

15. A non-transitory computer-readable storage element having computer readable code stored thereon for programming a computer to perform a method performed by a Mutual Aid QoS Function (MAQF) for determining policy for user equipment (UE) providing mutual aid for public safety purposes in a mutual aid enterprise operating area in a shared Long Term Evolution system, wherein the LTE system comprises a core network that provides service to a plurality of radio access networks, the method comprising:

receiving, by the MAQF, an indication that a UE is assigned to provide mutual aid in a mutual aid enterprise operating area, wherein the UE has a home enterprise operating area that is different than the mutual aid enterprise operating area, wherein the enterprise operating areas of both the home enterprise operating area and the mutual aid enterprise operating area are of the shared LTE system, and wherein each enterprise operating area of the home enterprise operating area and the mutual aid enterprise operating area is associated with a one or more different radio access networks of the plurality of radio access networks;

detecting that the UE has entered the mutual aid enterprise operating area; selecting a set of mutual aid policy rules for the UE while the UE is providing mutual aid in the mutual aid enterprise operating area, wherein the set of mutual aid policy rules are different from, and provide a different level of service than, a set of policy rules applied to non-mutual aid users equipment (UEs) visiting the radio access networks associated with the mutual aid enterprise operating area.

* * * * *

UNITED STATES PATENT AND TRADEMARK OFFICE
CERTIFICATE OF CORRECTION

PATENT NO.          : 8,971,258 B2  
APPLICATION NO.     : 12/848122  
DATED               : March 3, 2015  
INVENTOR(S)         : James A. Marocchi et al.

It is certified that error appears in the above-identified patent and that said Letters Patent is hereby corrected as shown below:

On the Title Page, Item 54 and in the Specification, in Column 1, Line 2, in Title, delete "PROVIDNG" and insert -- PROVIDING --, therefor.

On Title Page 2, Item 56, under "OTHER PUBLICATIONS", in Column 1, Line 24, delete "Architecuture" and insert -- Architecture --, therefor.

On Title Page 2, Item 56, under "OTHER PUBLICATIONS", in Column 2, Line 7, delete "Dicsussion," and insert -- Discussion, --, therefor.

On Title Page 2, Item 56, under "OTHER PUBLICATIONS", in Column 2, Line 10, delete "Bandwith" and insert -- Bandwidth --, therefor.

Signed and Sealed this  
Third Day of May, 2016

Michelle K. Lee  
*Director of the United States Patent and Trademark Office*